US008047250B2

(12) United States Patent
Kolp et al.

(10) Patent No.: US 8,047,250 B2
(45) Date of Patent: Nov. 1, 2011

(54) POSTAGE LABEL DISPENSING SYSTEM AND REPOSITIONABLE PEELER GUIDE THEREFOR

(75) Inventors: Benjamin J. Kolp, Derby, CT (US); David W. Beckstrom, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 226 days.

(21) Appl. No.: 12/623,941

(22) Filed: Nov. 23, 2009

(65) Prior Publication Data

US 2011/0120655 A1 May 26, 2011

(51) Int. Cl.

| | |
|---|---|
| ***B65C 9/00*** | (2006.01) |
| ***B29C 65/48*** | (2006.01) |
| ***B32B 37/00*** | (2006.01) |
| ***B32B 38/04*** | (2006.01) |
| ***B32B 38/10*** | (2006.01) |
| ***B32B 38/14*** | (2006.01) |
| ***B32B 43/00*** | (2006.01) |

(52) U.S. Cl. ........ 156/387; 156/510; 156/540; 156/759; 156/764; 156/767

(58) Field of Classification Search .......... 156/247–250, 156/257, 277, 289, 719, 384, 387, 510, 537, 156/540, 759, 764, 766, 767, DIG. 1, DIG. 24
See application file for complete search history.

(56) References Cited

U.S. PATENT DOCUMENTS 3,710,667 A * 1/1973 Kluger ............................ 83/203
3,713,948 A * 1/1973 Kluger .......................... 156/351
3,852,139 A * 12/1974 Jenkins ......................... 156/250
4,017,350 A * 4/1977 Thomas ......................... 156/384
4,024,011 A * 5/1977 Crankshaw et al. .......... 156/299
4,025,382 A * 5/1977 Del Rosso ..................... 156/497
4,081,309 A * 3/1978 Jenkins ......................... 156/250
4,082,595 A * 4/1978 Slater ............................ 156/351
4,087,304 A * 5/1978 Hamisch, Jr. ................. 156/384
4,210,484 A * 7/1980 Crankshaw et al. .......... 156/542
4,366,023 A * 12/1982 Voltmer ........................ 156/542
4,475,978 A * 10/1984 Bartl ............................. 156/497
4,497,420 A * 2/1985 Stelcher et al. ................. 221/13
4,544,437 A * 10/1985 Gibson .......................... 156/751
4,671,843 A * 6/1987 Olsen ............................ 156/450
4,867,833 A * 9/1989 McCoy .......................... 156/361
4,931,127 A * 6/1990 Matsumoto ................... 156/361
4,944,827 A * 7/1990 Lilly et al. .................... 156/384
4,954,203 A * 9/1990 Matsumoto ................... 156/361
5,040,461 A * 8/1991 Van-Ocker .................... 101/288
(Continued)

*Primary Examiner* — Sing P Chan
(74) *Attorney, Agent, or Firm* — Brian A. Collins; Charles R. Malandra, Jr.; Steven J. Shapiro

(57) ABSTRACT

A postage label dispensing system for dispensing adhesive-backed labels including a face material having an adhesive backing and a liner material detachably bonded to the adhesive backing. The adhesive backing defines a plurality of longitudinal adhesive strips and at least one non-adhesive region disposed therebetween and the face material includes at least one longitudinal cut disposed adjacent to, and aligned with, the non-adhesive region. The label dispensing system includes a system for displacing a supply of label material along a feed path and a peeler guide interposing the feed path operative to (i) guide the label material between upper and lower guide members of the peeler guide, (ii) induce a bend in the liner material along an axis substantially parallel to the at least one longitudinal cut, and (iii) separate an edge of the face material from the liner material along at least a portion of the longitudinal cut.

24 Claims, 10 Drawing Sheets

U.S. PATENT DOCUMENTS 5,116,452 A * 5/1992 Eder ..... 156/566
5,133,827 A * 7/1992 Ratermann ..... 156/361
5,167,752 A * 12/1992 Dowling ..... 156/512
5,209,374 A * 5/1993 Seidl-Lichthardt ..... 221/73
5,221,405 A * 6/1993 Trouteaud ..... 156/364
5,300,160 A * 4/1994 Wilson et al. ..... 156/64
5,370,754 A * 12/1994 Soloman ..... 156/64
5,405,482 A * 4/1995 Morrissette et al. ..... 156/364
5,587,043 A * 12/1996 Hying et al. ..... 156/566
5,718,525 A * 2/1998 Bruhnke et al. ..... 400/586
5,730,816 A * 3/1998 Murphy ..... 156/64
5,785,798 A * 7/1998 Horsman et al. ..... 156/361
5,853,530 A * 12/1998 Allen ..... 156/541
5,902,449 A * 5/1999 Moore ..... 156/541
5,938,890 A * 8/1999 Schlinkmann et al. ..... 156/541
5,980,138 A * 11/1999 Shiozaki et al. ..... 400/582
6,068,419 A * 5/2000 Shiozaki et al. ..... 400/582
6,143,105 A * 11/2000 Nash et al. ..... 156/64
6,179,030 B1 * 1/2001 Rietheimer ..... 156/360
6,230,780 B1 * 5/2001 Rietheimer ..... 156/577
6,261,009 B1 * 7/2001 Petteruti et al. ..... 400/61
6,378,590 B1 * 4/2002 Allen et al. ..... 156/542
6,428,227 B2 * 8/2002 Petteruti et al. ..... 400/691
6,451,149 B1 * 9/2002 McKenney et al. ..... 156/238
6,516,851 B1 * 2/2003 Thatcher et al. ..... 156/357
6,991,130 B2 * 1/2006 Presutti et al. ..... 221/73
7,017,820 B1 * 3/2006 Brunner ..... 235/487
7,089,986 B2 * 8/2006 Hayasaka et al. ..... 156/556
7,097,721 B2 * 8/2006 Norris ..... 156/64
7,138,033 B2 * 11/2006 Hayasaka ..... 156/304.3
7,871,009 B1 * 1/2011 Blonigen et al. ..... 235/487
7,900,675 B2 * 3/2011 Dangami et al. ..... 156/387
7,963,710 B2 * 6/2011 Kobayashi et al. ..... 400/613
7,975,743 B2 * 7/2011 Sleiman et al. ..... 156/358
7,985,170 B2 * 7/2011 George ..... 493/375
2001/0026725 A1 * 10/2001 Petteruti et al. ..... 400/691
2002/0088550 A1 * 7/2002 Allen et al. ..... 156/497
2003/0098131 A1 * 5/2003 Hayasaka et al. ..... 156/537
2003/0140804 A1 * 7/2003 Korthauer ..... 101/288
2004/0050497 A1 * 3/2004 Presutti et al. ..... 156/349
2004/0074582 A1 * 4/2004 Davis et al. ..... 156/64
2005/0167623 A1 * 8/2005 Yonekawa ..... 250/589
2006/0027332 A1 * 2/2006 Dangami ..... 156/541
2006/0056900 A1 * 3/2006 Itakura ..... 400/611
2006/0118571 A1 * 6/2006 Presutti et al. ..... 221/73
2006/0132576 A1 * 6/2006 Lowery et al. ..... 347/106
2006/0144521 A1 * 7/2006 Esposito et al. ..... 156/361
2006/0185796 A1 * 8/2006 Hayasaka et al. ..... 156/361
2006/0237125 A1 * 10/2006 Montgomery et al. ..... 156/249
2006/0249258 A1 * 11/2006 Painter et al. ..... 156/541
2007/0004575 A1 * 1/2007 George ..... 493/405
2007/0039677 A1 * 2/2007 Chapman ..... 156/64
2007/0095482 A1 * 5/2007 Benton ..... 156/539
2007/0131344 A1 * 6/2007 Tsujimoto et al. ..... 156/248
2008/0014344 A1 * 1/2008 Fort et al. ..... 427/207.1
2008/0029221 A1 * 2/2008 Dangami et al. ..... 156/379
2008/0047660 A1 * 2/2008 Angel et al. ..... 156/238
2009/0028622 A1 * 1/2009 Kobayashi et al. ..... 400/613
2009/0084503 A1 * 4/2009 Kobayashi ..... 156/443
2009/0090469 A1 * 4/2009 Painter et al. ..... 156/362
2009/0188613 A1 * 7/2009 Fearn ..... 156/249
2011/0048608 A1 * 3/2011 Dods et al. ..... 156/64

* cited by examiner

POSTAGE LABEL DISPENSING SYSTEM AND REPOSITIONABLE PEELER GUIDE THEREFOR

FIELD OF THE INVENTION

The present invention relates to apparatus for producing adhesive-backed labels, and more particularly, to a system for dispensing adhesive-backed labels in multiple operating modes.

BACKGROUND OF THE INVENTION

Conventional apparatus for producing and dispensing adhesive-backed labels include: (i) a device for printing information/symbology on the face of a label supply, i.e., a web/spool of a label face/liner material, and (ii) a cutting apparatus for separating the label face/liner material from the web/spool i.e., to produce a single adhesive-backed/lined label. While some of the label producing apparatus provide a stack of individually-printed labels ready for an operator to remove the liner (also referred to as the "backing material"), other label fabrication systems (oftentimes including a device known as "peeler bar") automatically separate the face material from the liner to provide an application-ready label. With regard to the former, it will be appreciated that the stack of labels facilitates application thereof at a subsequent time or at a remote location, i.e., not within the immediate vicinity of the label producing apparatus. However, the operator is tasked with removing the adhesive backed label from the liner at the time of application which can be a laborious/costly operation. With respect to the former, it will be appreciated that the automated system for separating the adhesive-backed label face from the liner can be complex, and does not provide the operator with the option of applying the label at a remote location. That is, an operator must apply individual labels immediately upon label dispensation.

Mailing machines are devices which may include a label fabrication and/or dispensing system for the purpose of applying postage to mailpiece envelopes. These machines often include an option to print and dispense postage indicia/franking symbology either; (i) directly on the face of a mailpiece envelope, or (ii) on an adhesive-backed label which can, thereafter, be applied to the mailpiece envelope. With respect to the latter, the option to print a postage indicia/franking label is often selected when the surface contour of the mailpiece envelope is irregular and printing directly on the face may result in a distorted image. Examples include envelopes having irregularly shaped content material, or those including a liner or layer to protect fragile content material ("bubble-wrap" protection).

These options are accommodated by a print station having at least one print head which is moveable, along rails or guides, from one feed path to another. In one operating mode, the print head is positioned in the feed path of a sealed/completed envelope to print on the face of the envelope, and, in another operating mode, the print head is positioned directly over the feed path of a supply/spool of label face/liner material. Once printed, the label is cut, accumulated and/or dispensed in the manner described above in connection with conventional label fabrication/dispensing systems.

In addition to the various shortcomings associated with conventional label fabrication/dispensing systems, mailing machines introduce the added complexity of printing currency on the labels which are fabricated. That is, inasmuch as the label fabrication systems commonly associated with mailing machines print currency, these systems must be highly reliable to prevent the operator from incurring additional cost as a result of a torn or damaged postage indica/franking label. It will be appreciated that, once debited from the vault of the mailing machine, a damaged or improperly printed/dispensed postage label cannot be easily/immediately credited without being validated by an authorized source, e.g., a Postal Authority.

A need, therefore, exists for a label fabrication and dispensing system which (i) accommodates multiple operating modes, i.e., labels dispensed with a liner intact or removed, and (ii) facilitates the separation of the label face from the liner removal, (iii) minimizes complexity for added reliability.

SUMMARY OF THE INVENTION

A postage label dispensing system is provided for dispensing adhesive-backed labels including a face material having an adhesive backing and a liner material detachably bonded to the adhesive backing. The adhesive backing defines a plurality of longitudinal adhesive strips and at least one non-adhesive region disposed therebetween and the face material includes at least one longitudinal cut disposed adjacent to, and aligned with, the non-adhesive region. The label dispensing system includes a system for displacing a supply of label material along a feed path and a peeler guide interposing the feed path operative to (i) guide the label material between upper and lower guide members of the peeler guide, (ii) induce a bend in the liner material along an axis substantially parallel to the at least one longitudinal cut, and (iii) separate an edge of the face material from the liner material along at least a portion of the longitudinal cut. The upper guide member, furthermore, defines an opening for receiving the edge of the face material upon separation from the liner material and dispensing an application-ready label through the opening. A processor controls the operation of the conveyance system to draw the label material through the guide members such that the separated edge of the application-ready label is dispensed through the opening in the upper guide member of the peeler guide.

BRIEF DESCRIPTION OF THE DRAWINGS

Further details of the present invention are provided in the accompanying drawings, detailed description, and claims.

DETAILED DESCRIPTION

A system for dispensing and/or fabricating adhesive-backed labels is described herein. The invention is described in the context of a system for dispensing printed labels, a removable module for dispensing printed labels, and a system for fabricating and dispensing postage labels. The inventive teachings are also described in the context of a mailing machine for printing postage indicia/franking labels, although, it should be appreciated that any label producing and/or dispensing apparatus may be employed. A mailing machine merely provides an illustrative example of one embodiment of the invention, and should not be considered limiting when interpreting the meaning and/or scope of the appended claims.

Figure 1:
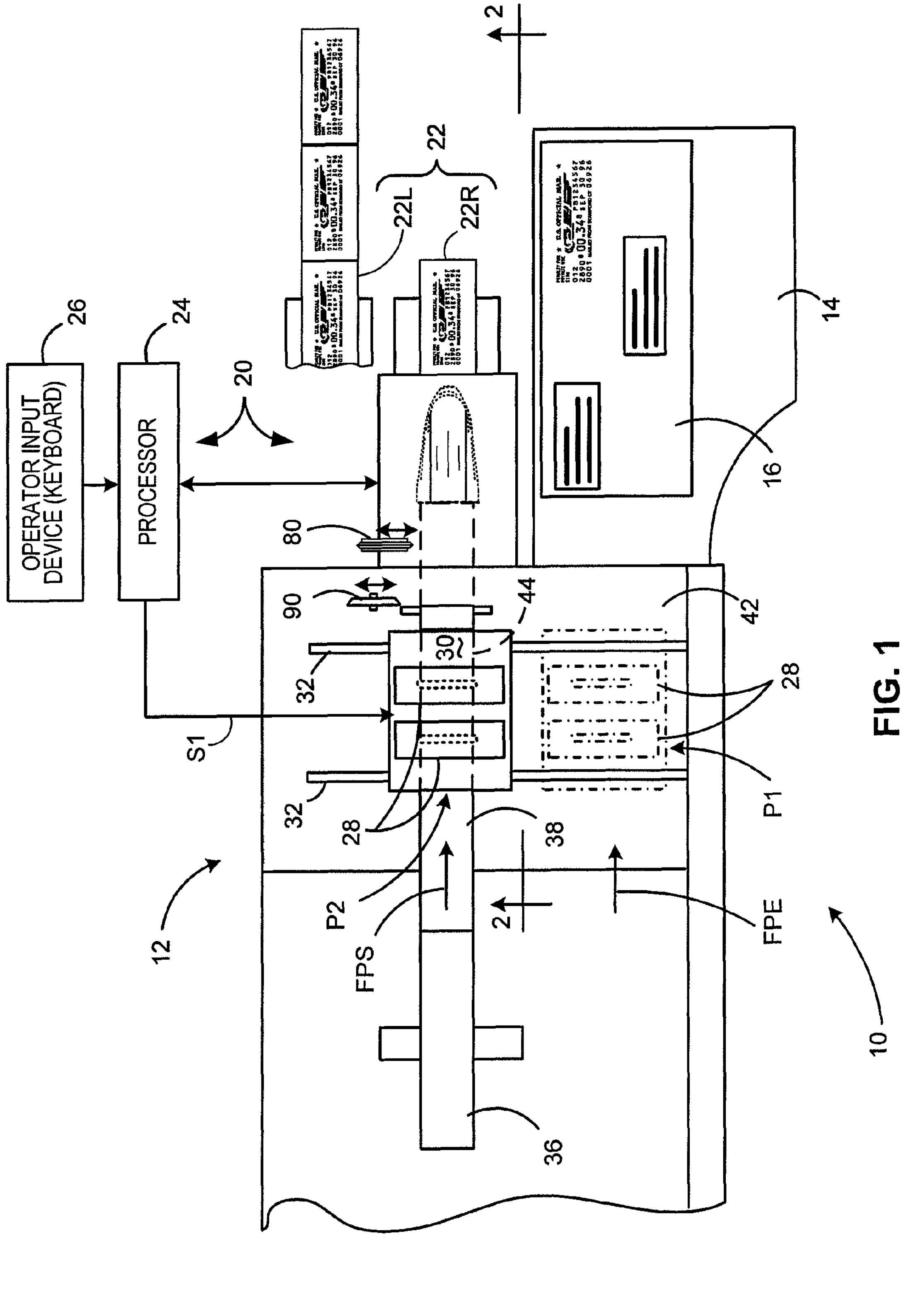
FIG. 1 is a top schematic view of a mailing machine including a positionable print head for printing along two feed paths, a first feed path for printing on the face of a mailpiece envelope, and a second feed path for printing on label material.

FIG. 1 depicts a schematic, broken-away top view of a mailing machine 10 according to the teachings of the present invention. In particular, the views illustrate a print station 12 in combination with a forward stacking tray 14 for receiving finished mailpieces 16, and a system 20 for dispensing adhesive-backed postage indicia/franking labels 22 (hereinafter referred to simply as "postage labels"). The postage labels 22 may be dispensed as application ready labels 22R, i.e., adhesive backed printed labels having the lining removed for immediate application, or as lined labels 22L, i.e., printed labels 22 with a liner to protect the adhesive backing of the printed label 22 for subsequent application.

The mailing machine 10 and label dispensing system 20 of the present invention include a processor 24 which receives operator input through a conventional input device 26, e.g., a touch screen display, keyboard, etc., to control the various operations of the mailing machine 10 and label dispensing system 20. With regard to the mailing machine 10, these inputs may include information regarding the type of mailpieces being processed, their weight, (if the machine is not equipped with a scale, or weigh-on-the-way system), print resolution, vault information, encryption/security inputs, network information, etc. In addition to these inputs, the mailing machine 10 of the present invention includes an option to print postage indicia and/or franking symbology either: (i) on the face of the mailpiece envelope 16, or (ii) on the face of the postage label 22. This is achieved by mounting at least one of the print heads 28 on a moveable carriage 30/rail system 32 which extends orthogonally across the feed path FPE of the processed mailpiece envelope 16 or, the feed path FPS of a web/spool 36 of label material 38. More specifically, the processor 24 is operatively coupled to an actuator (not shown) in the print station 12 to reposition at least one of the print heads 28 along one of the feed paths FPE, FPS depending upon the option selected by the operator. In a first position P1 (shown in phantom lines), the print heads 28 are disposed across the feed path of finished mailpieces and print postage indicia directly on the face of the mailpiece envelope 16. In a second position P2, (shown in solid lines), the print heads 28 are positioned across the feed path FPS of the web/spool supply 36 to print the postage indicia on the face of the label material 38.

While not shown in the schematic illustrations, each feed path FPE, FPS includes a transport system for conveying the finished envelope 16 or supply of label material 38. An envelop transport system may include a series of rollers along an envelope transport deck 42 of the mailing machine 10 for conveying the finished mailpiece through the print station 12 to the stacking tray 14. Similarly, a label material transport system may include rollers (not shown) to pay-out the label material 38 along a label transport deck 44 through the print station 12 to the label dispensing system 20.

Before discussing the operation of the label dispensing system 20, it will be useful to provide a brief description of the various components and their arrangement within the mailing machine 10. In the described embodiment and referring to FIGS. 1 and 2, the print heads 28 of the mailing machine 10 print postage indicia on the label material 38 which includes an adhesive-backed face material 46 and a liner material 48 to protect and carry the adhesive-backed face material 46. It will be appreciated that the face material 46 is processed by the mailing machine 10 and label dispensing system 20 (i.e., printed, cut and dispensed) to produce the postage labels 22, i.e., either an application ready label 22R or a lined-label 22L. Once printed, the label material 38 is paid-out though an exit orifice EX of the mailing machine 10 and received by the label dispensing system 20.

The face material 46 includes an adhesive backing AB defining a plurality of adhesive strips ASC, ASE and at least one non-adhesive region NA disposed therebetween. Furthermore, the face material 46 includes at least one longitudinal cut 47 disposed adjacent to, and aligned with, each non-adhesive region NA. Generally, the longitudinal cut 47 bisects the non-adhesive region NA, although the cut 47 may be biased toward one or the other of the adhesive strips ASC, ASE. In the illustrated embodiment, the face material 46 includes a pair of longitudinal cuts 47*a*, 47*b* disposed between a central adhesive strip ASC and edge strips ASE disposed to each side of the central strip ASC. As such, the label material 38 includes an intermediate strip 46C of face material 46 wherein a postage indicia IN may be printed and edge strips 46SE which may be used to augment separation of the intermediate strip 46C from the liner material 48 during dispensation of a printed label. This aspect of the invention will be discussed in greater detail when discussing the operation of the label dispensing system 20 and the dispensation of an application ready label.

The label dispensing system 20 includes a detachable housing 50 having a dispensing and waste outlets D and W, respectively, for dispensing (i) application-ready labels 22R (FIG. 1), i.e., printed labels having the liner material 48 removed for immediate application, (ii) waste material (not shown in FIGS. 1 and 2), i.e., liner material 48 and/or face material 46 which is produced following dispensation of the application-ready labels 22R, and (iii) lined labels 22L (see FIG. 1), i.e., adhesive-backed printed labels including the liner material 38 to protect the adhesive backing or carrier printed labels 22 along the internal feed path of the label dispensing system 20. The dispensing outlet D is disposed through an end portion of the housing 50 and is dedicated to dispensing ready-to-use/application-ready printed labels 22R i.e., adhesive-backed labels without liner material 48, and a stack, stream or length of lined labels 22 which can be removed for application at a subsequent time or at a remote location. The waste outlet W is disposed through a lower portion of the housing 50, and is operative to remove waste material after dispensing the application ready label 22R from the dispensing outlet D.

Figures 2, 2A:
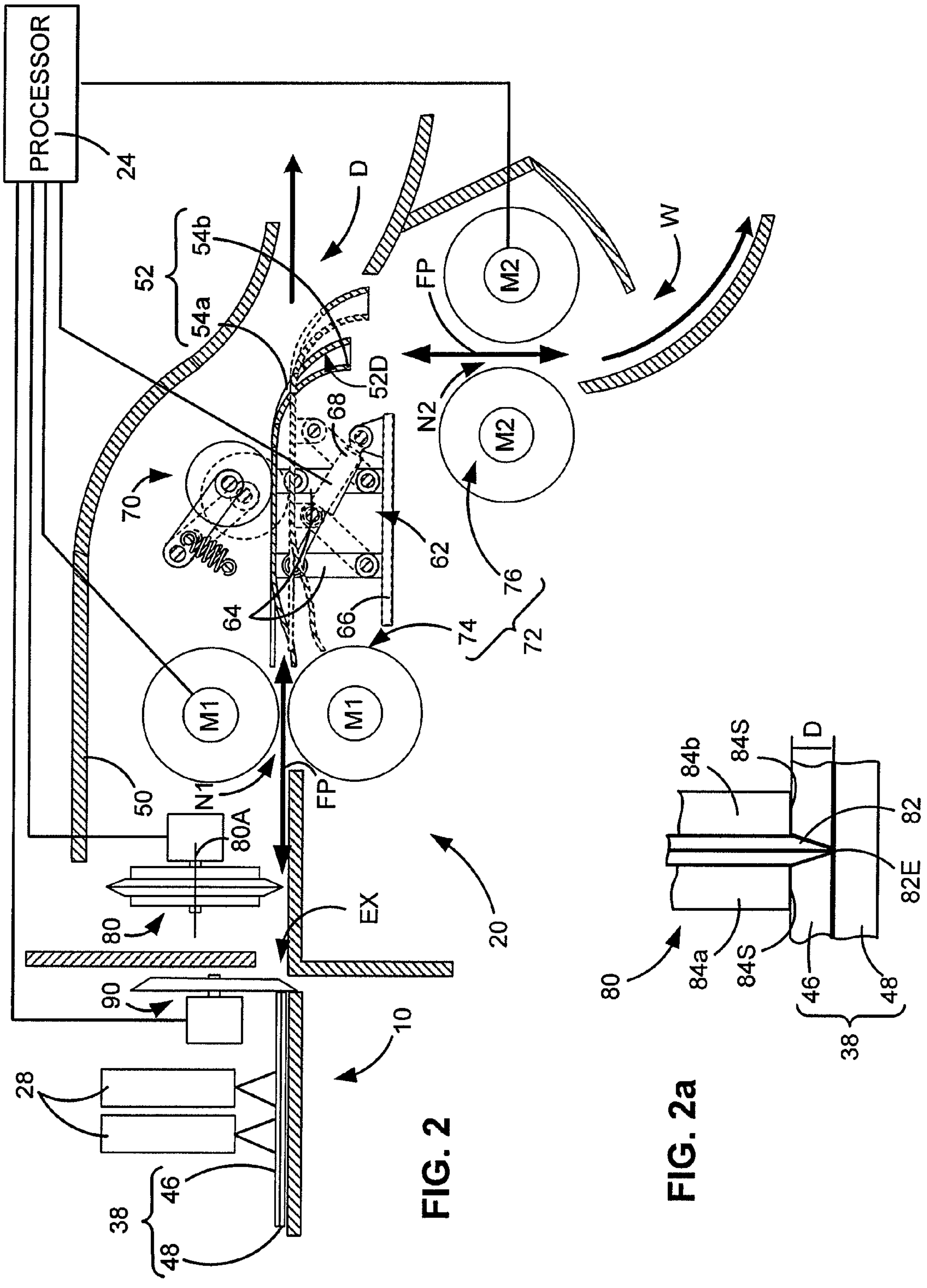
FIG. 2 is a side schematic view of the mailing machine from a perspective along line 2-2 of FIG. 1 depicting the relevant details of a label dispensing system including a system for displacing the label material along the feed path, and a peeler guide operative to strip and dispense labels from and outlet of a housing.
FIG. 2*a* is an enlarged, broken away front view of a cutting apparatus operative to produce a cut of a prescribed depth through the label material (i.e., a kiss-cut)
Figure 3:
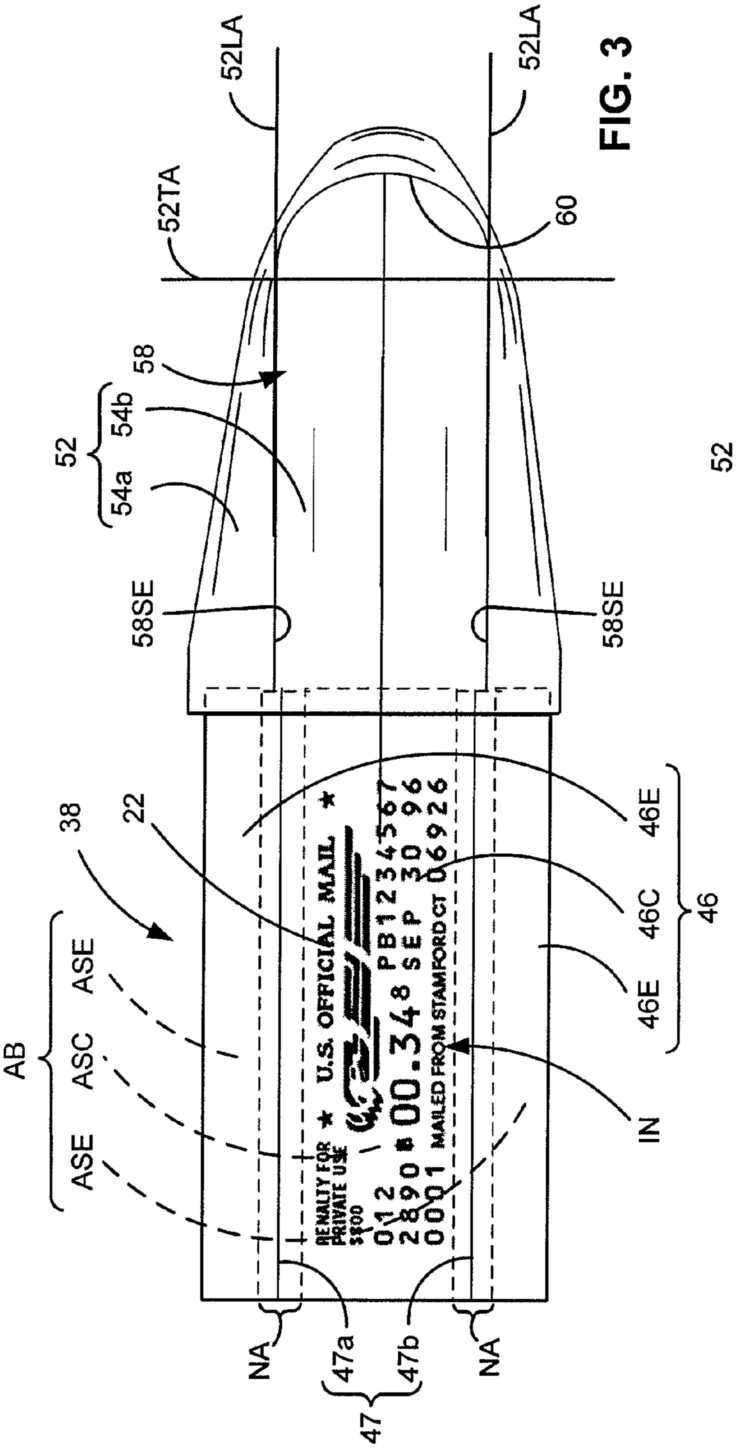
FIG. 3 depicts a top view of the peeler guide receiving label material having a printed postage indicia thereon.
Figure 3A:
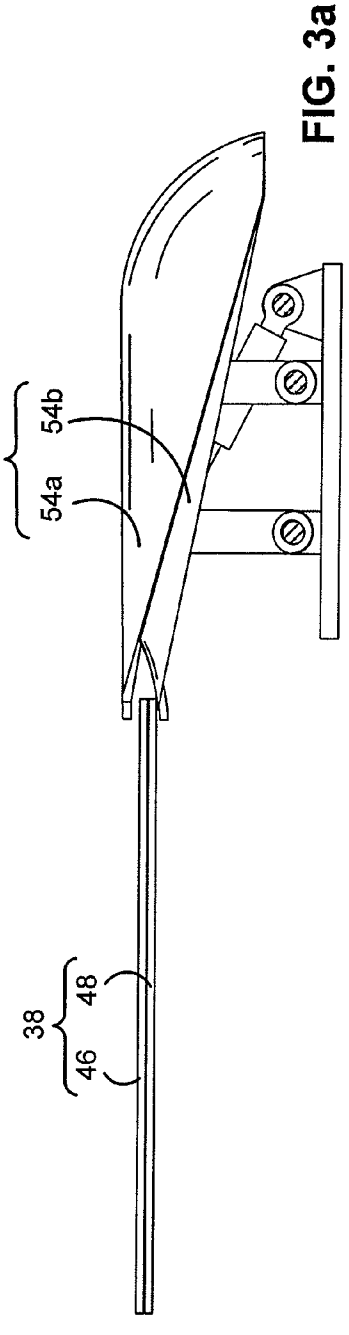
FIG. 3*a* is a side view of the peeler guide and label material shown in FIG. 3.
Figure 4:
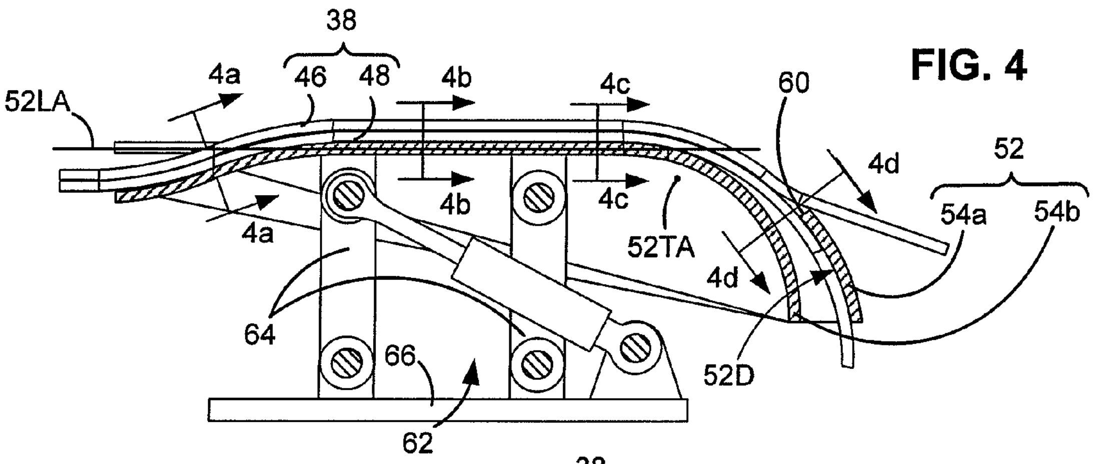
FIG. 4 is a cross sectional view taken substantially along line 3*b*-3*b* of FIG. 3*a*.

In FIGS. 2, 3 and 3*a*, the housing 50 is operative to support a repositionable peeler guide 52 and a conveyance system 72 for displacing the label material 38 through the peeler guide 52. More specifically, the peeler guide 52 includes upper and lower guide members 54*a*, 54*b* each defining guide surfaces 56*a*, and 56*b*, respectively. In FIGS. 3 through 4*d*, the guide surfaces 56*a*, 56*b* cooperate to guide the label material 38 therebetween, induce a bend in the liner material 48 along an axis 52LA substantially parallel to each of the longitudinal cuts 47*a*, 47*b*, and separate an edge 46E (see FIG. 4*d*) of the face material 46 from the liner material 48 along at a portion of the longitudinal cuts 47*a*, 47*b*. More specifically, the upper guide member 54*a* defines an opening 58 (see FIG. 3) having an arcuate separation edge 60 (see FIGS. 3, 4, and 4*d*) which is operative to interpose the separated edge 46SE of the face material 46 and the liner material 48 as the label material 38 is drawn through the peeler guide 52. The opening 58 has linear side edges 58SE disposed outboard of the longitudinal cuts 47*a*, 47*b* in the label material 38, which side edges 58SE transition to form the arcuate separation edge 60. Furthermore, the opening 58 defines a substantially U or V-shape when viewed from a top perspective (best seen in FIG. 3). Moreover, the arcuate separation edge 60 is disposed downstream of the entrance to the peeler guide 52.

Figure 4A:
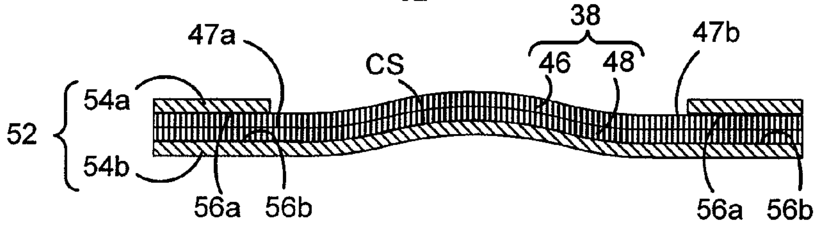
FIG. 4*a* is a cross sectional view taken substantially along line 4*a*-4*a* of FIG. 4.
Figure 4B:
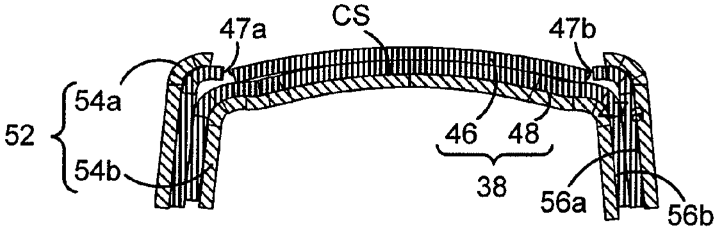
FIG. 4*b* is a cross sectional view taken substantially along line 4*b*-4*b* of FIG. 4.
Figure 4C:
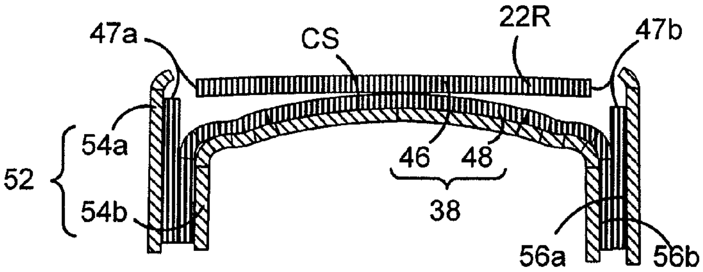
FIG. 4*c* is a cross sectional view taken substantially along line 4*c*-4*c* of FIG. 4.
Figure 4D:
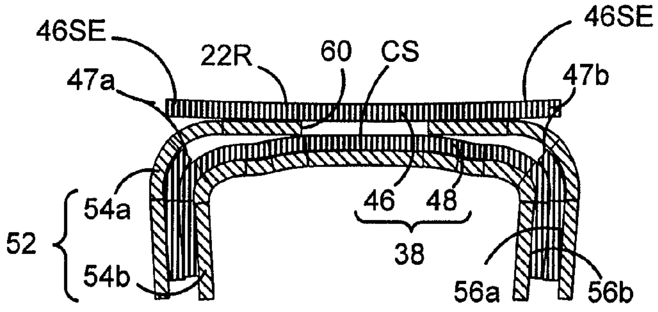
FIG. 4*d* is a cross sectional view taken substantially along line 4*d*-4*d* of FIG. 4.

In FIG. 4*a*, the label material 38 is received between the guide surfaces 54*a*, 54*b* such that the edge strips 46E of the face material 46 are secured between the guide surfaces 56*a*, 56*b* of the guide members 54*a*, 54. In FIGS. 4*b* and 4*c*, the guide members 54*a*, 54*b* induce a bend in the liner material 48 about each of the longitudinal cuts 47*a*, 47*b* such that the edge strips 46E transition from a substantially horizontal orientation (shown in FIG. 4*a*) to a substantially vertical orientation (shown in FIG. 4*c*). The bend induced by the guide members 56*a*, 56*b* causes the edges 46SE of the face material 46 to separate from the liner material 48 which separation is augmented by the non-adhesive regions NA established between the central strip ASC of the face material 46 and the liner material 48. In FIG. 4*d*, the label material 38 is inserted within, or drawn through, the guide members 54*a*, 54*b* such that separation edge 60 of the upper guide member 54*a* interpose the face and liner materials 46, 48. Accordingly, the bend about the transverse axis 52TA and arcuate separation edge 60 function to gradually separate the face material 46, or the printed label 22R, from the liner material 48, as the label material 38 is drawn through the peeler guide 52. As the label material 38 continues past the separation edge 60, the separation of the face material 46 or printed label 22R from the liner material 48 is completed.

Additionally, the guide surface 56*b* of the lower guide member 54*b* defines a convex curvature CS, projecting upwardly toward the opening 58 in the upper guide member, to impart a complimentary curvature to the printed label 22 upon dispensation of each application ready label. This feature imparts bending stiffness to the label material 38 and the printed label 22R to facilitate separation of the face material 46 from the liner material 48. Moreover, the guide surfaces 56*a*, 56*b* of the peeler guide 52 define an end deflector portion 52D which directs the liner material 48 downwardly toward the waste outlet W, i.e., a portion which effects a bend about an axis 52TA orthogonal to the feed path once the face material 46 has begun to separate from the liner material 48. These features of the invention will be discussed in greater detail when discussing the various operational steps of the label dispensing system 20.

The peeler guide 52 is pivotally mounted within the housing 50 by a displacement mechanism 62 which repositions or reconfigures the peeler guide 52 such that the label material 38 is received between the guide members 54*a*, 54*b*, in a first operating mode, and slides over or across an upper guide surface of the peeler guide 52, in a second operating mode. In the described embodiment, the peeler guide 52 is pivotally mounted to the housing 50 by a four bar linkage arrangement which effects rotational and vertical translation of the peeler guide 52 relative to the feed path FP of the label material 38. More specifically, one or more pairs of links 64 are pivotally mounted to the underside of the peeler guide 52 at one end thereof and to a stationary platform 66 of structure of the housing 50 at the other end. Furthermore, a linear actuator 68, controlled by the processor 24 is pivotally mounted to one of the links 64 at one end thereof and to the stationary platform 66 at the other end to reposition the peeler guide 52 from the first to the second positions depending upon the selected operating mode. In the second operating mode, i.e., when the label material 38 passes over an upper surface of the peeler guide 52, a spring biased roller assembly 70 may be employed to capture/secure the label material 38 as it slides over the peeler guide.

Alternatively, the upper guide member 54*a* may be separated from the lower guide member 54*b*, i.e., raised upwardly, such that the label material 38 is not captured and/or directed by the peeler guide 52. Accordingly, in the second operating mode, the label material 38 passes over the lower guide member 54*b* and out the dispensing outlet D. This aspect of the invention will also become clear when discussing the operation of the label dispensing system 20.

The conveyance system 72 includes a first and second pair of rollers, 74 and 76, respectively, disposed on the input and output sides of the peeler guide 52 to displace the label material 38 through the guide members 54*a*, 54*b* of the peeler guide 52. While the guide surfaces 56*a*, 56*b* of the peeler guide 52 includes a deflector guide portion 52D, it should be appreciated that a deflector guide (not shown) may be independently mounted to the housing 50 and positioned by a separate actuation device. In the illustrated embodiment, the first pair of rollers 74 are vertically oriented, i.e., rotate about axes which lie in a vertical plane, and define a first drive nip N1 which displaces the label material 38 along a substantially horizontal feed path FP. The second pair of rollers 76 are horizontally oriented, i.e., rotate about axes which lie in a horizontal plane, and define a second drive nip N2 which displaces the label material 38 along a substantially vertical feed path FP. While the first and second drive nips N1, N2 are substantially orthogonal to change the direction of the feed path from horizontal to vertical, it should be appreciated that other orientations are contemplated depending upon the location of the dispensing and waste outlets D, W.

Each pair of rollers 74, 76 may be driven by respective rotary drive motors M1, M2 which are controlled by the processor 24. The processor 24 can drive each of the motors M1, M2 and the respective rollers 74, 76 in either direction, i.e., to bi-directionally displace the label material 38 along the feed path FP and at the same or at variable speeds relative to each other. In this way, the label material 38 may be paid-out or drawn back at different rates of speed to increase or decrease the length of label material between each of the drive nips N1, N2.

While the supply of label material 38 may include precut label material, i.e., regularly spaced kiss-cuts penetrating through the face material 46, the label fabrication system 20 may include a cutting apparatus 80 for the purpose of cutting the face material 46 to any length. That is, since the label transport rollers and drive rollers 74, 76 control the amount of label material 38 which is paid-out from the label supply 36, each postage label 22 may be cut to any size, e.g., from two (2) inches to eight (8) inches, depending upon the information to be printed. For example, some labels 22 may contain only the postage indicia while others may include barcode security or other symbology. In the described embodiment and referring to FIG. 2*a*, the cutting apparatus 80 includes a disc-shaped cutter 82 having circular cutting edge 82E and a rotational axis 80A parallel to the feed path FP of the label material 38. The disc-shaped cutter 82 includes one or more bearings 84*a*, 84*b* each defining a bearing surface 84S disposed radially inboard of the cutting edge 82E. The radial distance D from the cutting edge 82E to the bearing surface 84S controls the depth of the kiss-cut into the label material 38, i.e., through the face material 46. In the described embodiment, the bearing surfaces 84S are disposed on each side of the cutter 82 to more precisely control the depth of the kiss-cut.

In addition to the first cutting apparatus 80, a second cutting apparatus 90 may be disposed upstream thereof, to sever the label material 38, i.e., cut through the liner material 48 or through the combined face and liner materials 46, 48. This cutting apparatus 90 may be disposed in either the mailing machine 10 or in the label dispensing system 20 and may be controlled by the same processor 24 employed to control the position of the peeler bar 54, the conveyance system 72, and the first cutting apparatus 80. As will be described in greater detail when discussing the operation of the mailing machine 10 and label dispensing system 20, the second cutting apparatus 90 is principally employed to cut each application ready label and/or discard waste material following the dispensation of an application ready label 22R.

Figure 5:
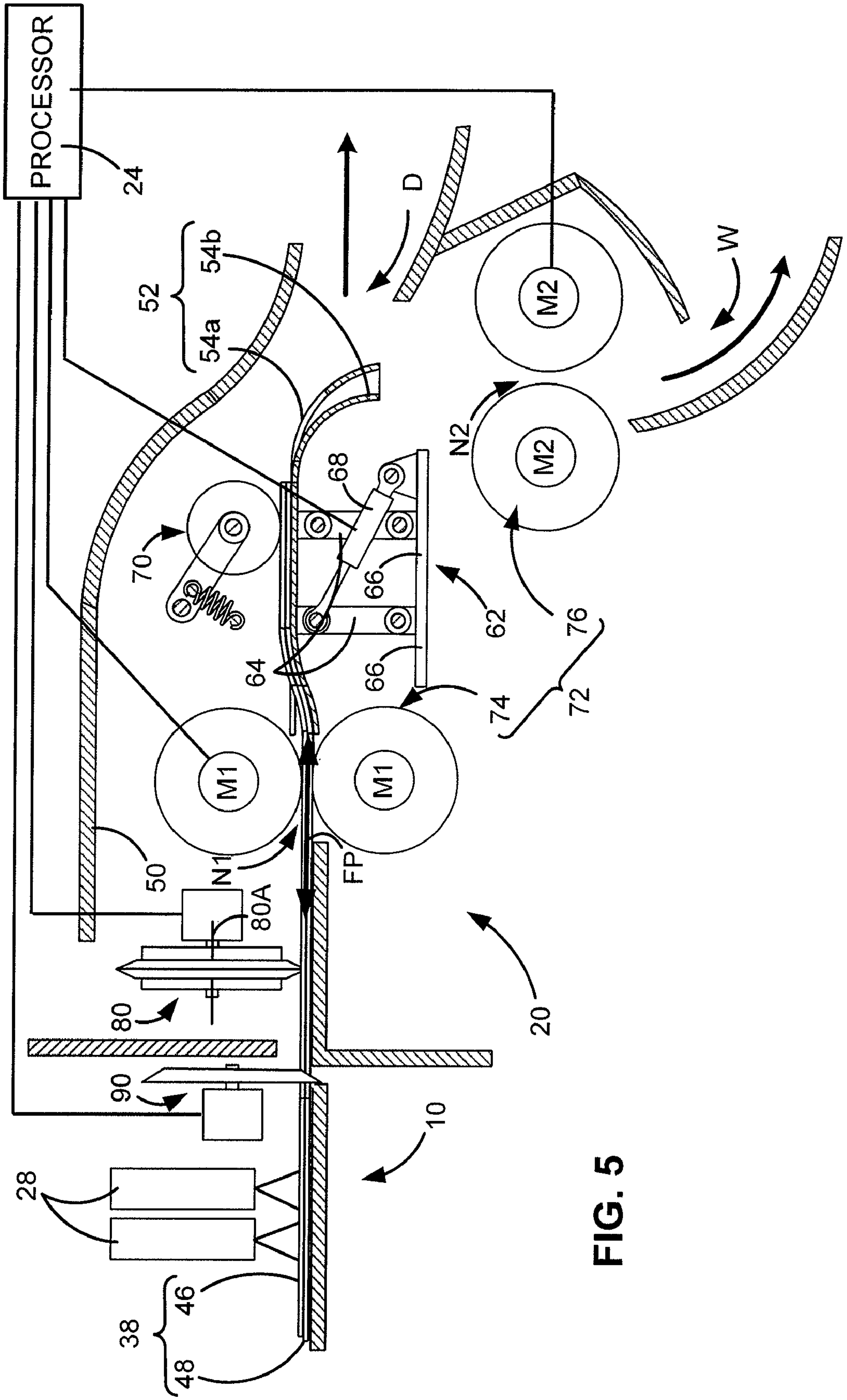
FIG. 5 depicts the label dispensing system in the first operating mode wherein the label material is received between upper and lower guide members of the peeler guide and a kiss-cut is made through the face material of the label material by a first cutting apparatus to cut a printed label.
Figure 7:
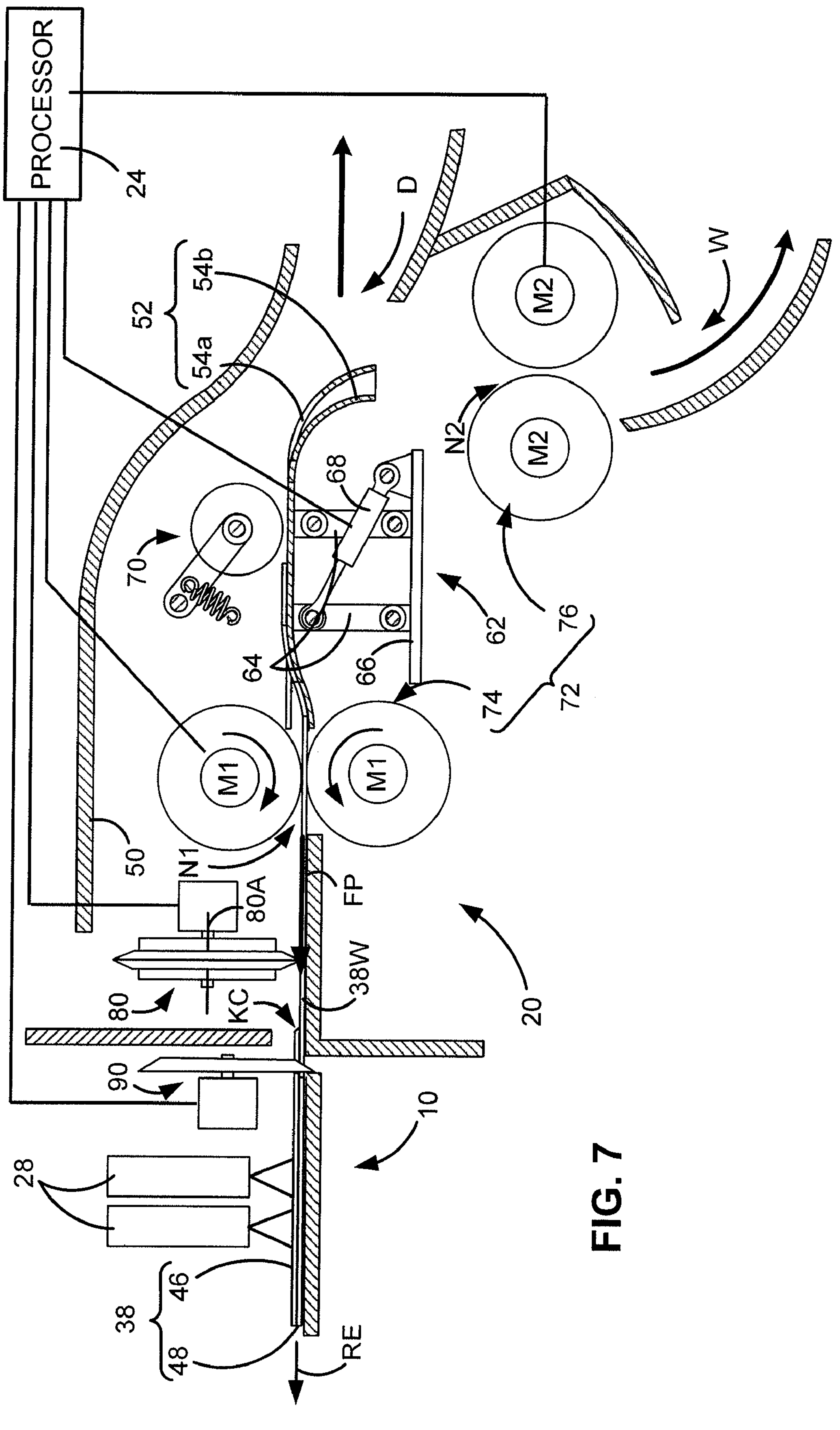
FIG. 7 depicts the label dispensing system in another operating mode, related to the first operating mode, wherein waste material including the liner material and any remaining face material is retracted or taken-in and cut by a second cutting apparatus, upstream of the first cutting apparatus.
Figure 8:
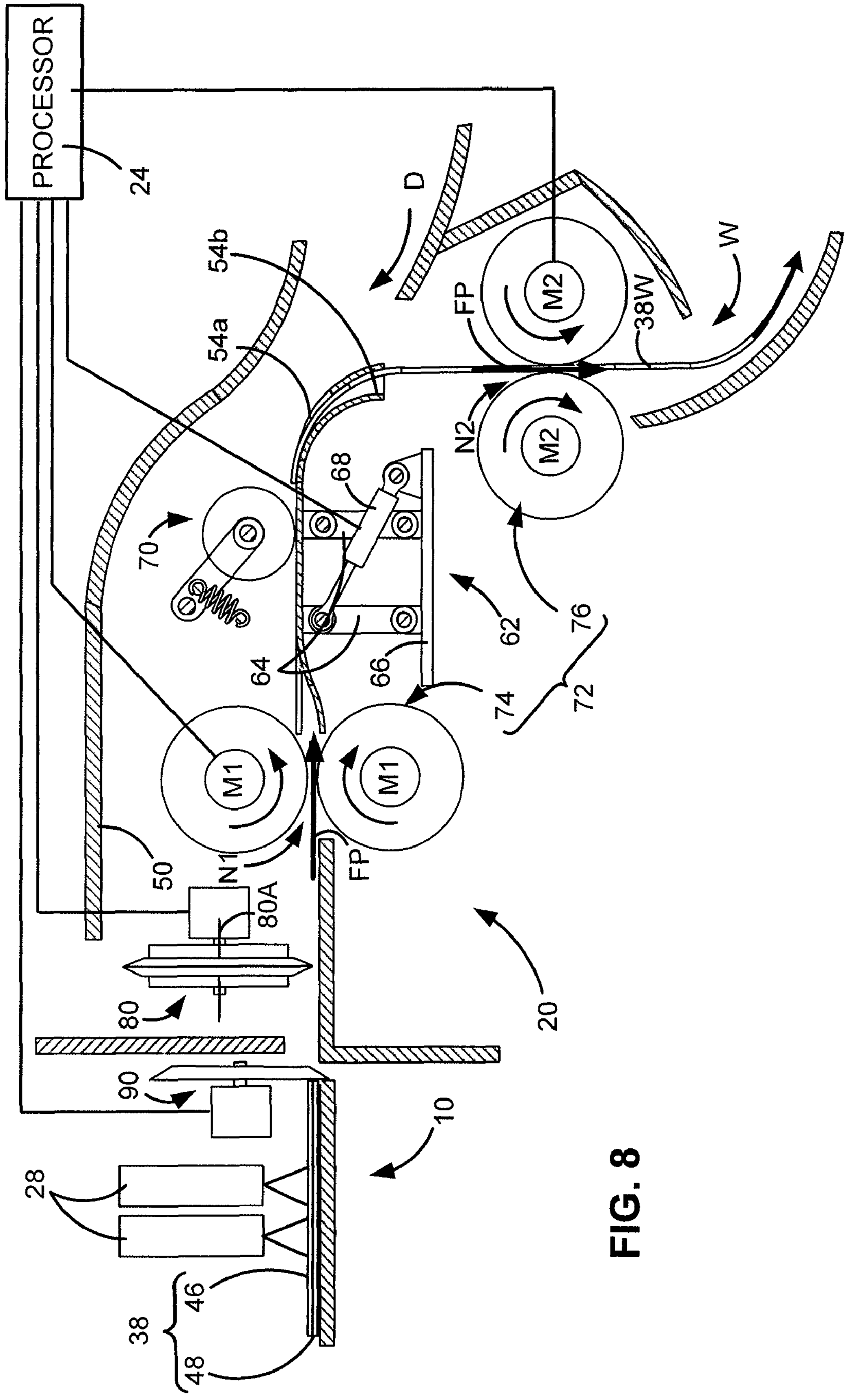
FIG. 8 depicts the label dispensing system in the other operating mode wherein the waste material is directed downwardly by the peeler guide through a waste outlet.
Figure 9:
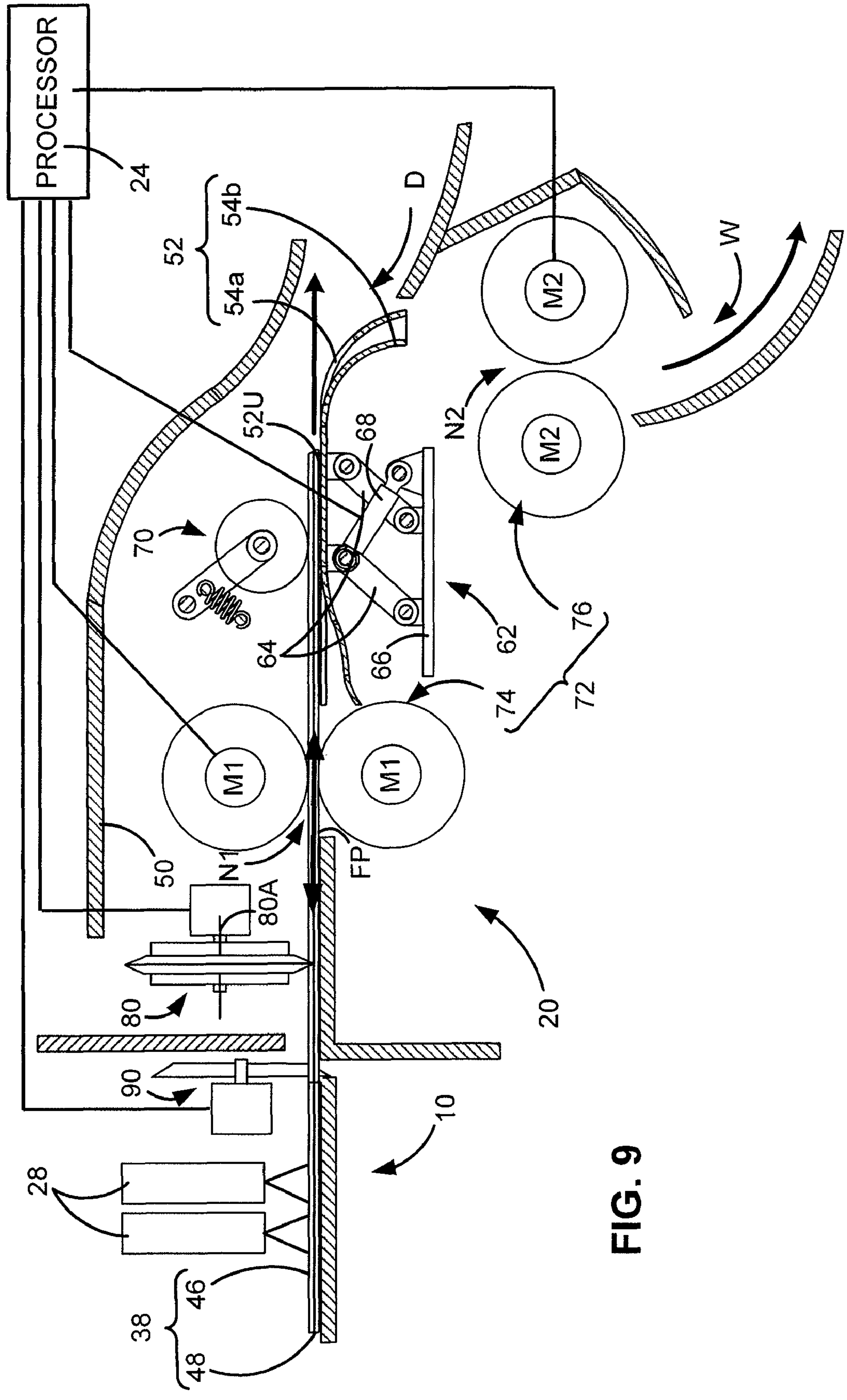
FIG. 9 depicts the label dispensing system in a second operating mode wherein the peeler guide is repositioned from a first position to a second position and the first cutting apparatus makes several kiss-cuts in the label material to produce a stream or plurality of lined labels.
Figure 10:
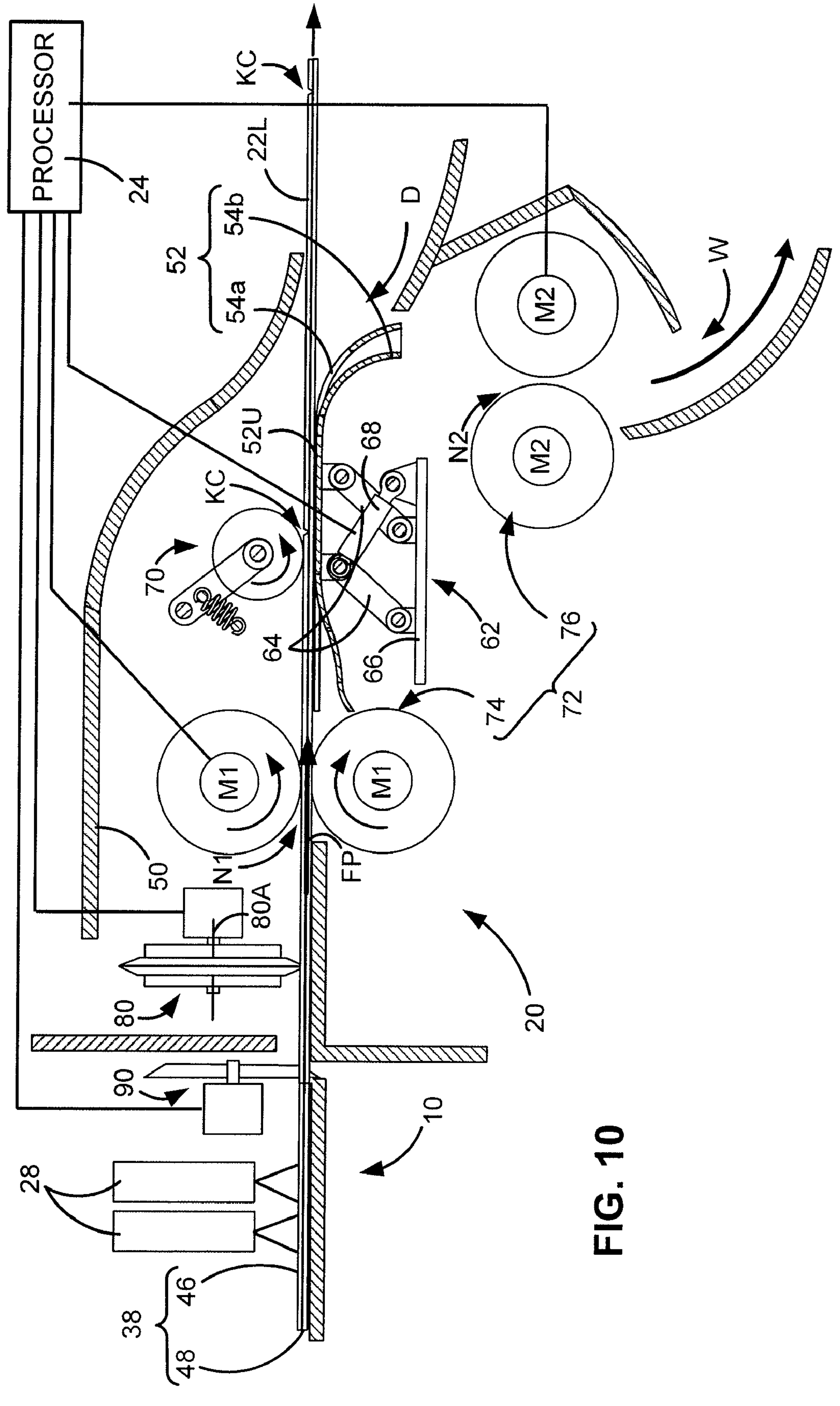
FIG. 10 depicts the label dispensing system in the second operating mode wherein the label material is guided and supported along an upper surface of the peeler guide for dispensing the lined labels through a dispensing outlet in the housing.

FIGS. 5 through 10 depict the operation of the label dispensing system 20 at various instants in time within one of several operating modes. These operating modes include: (i) a first operating mode associated with dispensing an application ready label 22R (FIGS. 5 and 6), (ii) another operating mode, which may be viewed as optional, associated with discarding or dispensing waste material 38W (FIGS. 7 and 8), and (iii) a second operating mode associated with dispensing lined labels 22R as a stream/length or stack of individual labels (FIGS. 9 and 10). In FIG. 5, the label material 38 having a postage indicia printed thereon is paid-out through the exit EX of the mailing machine 10 along the feed path FP and through the first nip N1 of the drive rollers 74. More specifically, the peeler guide 52 is in its initial, or first position. In the frame shown in FIG. 5, the nips N1, N2 are paused (not driving) as the second cutting apparatus 90 cuts a printed label 22 to the desired length i.e., immediately past or upstream of the printed postage indicia.

Figure 6:
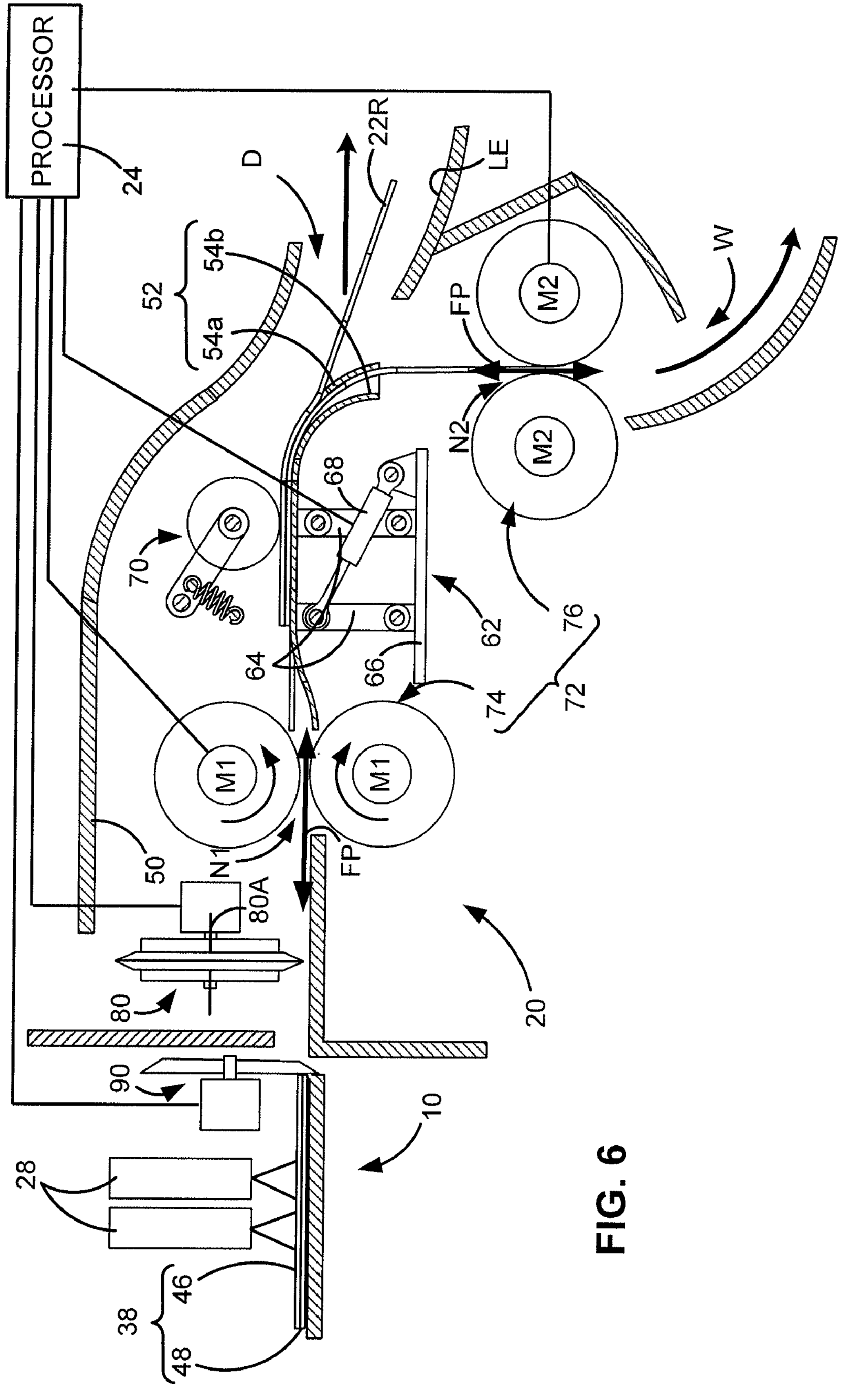
FIG. 6 depicts the label dispensing system in the first operating mode wherein an application-ready printed label is stripped from the liner material and dispensed through a dispensing outlet of the housing.

In FIG. 6, the deflector guide portion 52D of the peeler guide 52 has directed the liner material 48 downward through the second nip N2 of the second pair of drive rollers 76. Furthermore, the first and second pairs of rollers 74, 76 cooperate to push and/or pull the label material 38 through the peeler guide 52 such that the edge strips 46E of the face material 46 bend about the longitudinal axes 52LA and transition from a substantially horizontal orientation (best seen in FIG. 4*a*) to a substantially vertical orientation (see FIG. 4*c*). The bend induced by the guide members 56*a*, 56*b* causes the edges 46E of the face material 46 to separate from the liner material 48 inasmuch there is no adhesive, i.e., in the non-adhesive regions NA, to secure the edges against the liner material 48. Furthermore, as the liner material 48 is drawn through the peeler guide 52 the bend about the transverse axis 52TA cooperates with the separation edge 60 of the peeler guide 52 to separate the leading edge 22LE of the printed label 22R from the liner material 48. The label material 38, therefore, is displaced until a portion of an application ready label 22R extends through, and is dispensed from, the dispensing outlet D. Furthermore, the liner material 48 may be taken away by the second pair of rollers 76 for dispensation through the waste outlet W. Alternatively, and in another embodiment of the invention, the deflector guide portion 52D of the peeler guide 52 may function to drop the waste material 38, e.g., the liner material 48, through the waste outlet, i.e., via gravity feed. Consequently, in this embodiment of the label dispensing system, the second pair of rollers 76 may be deleted to save weight and additional cost.

It will be recalled from the previous description of the peeler guide 52 that the convex curvature of the lower guide member 54*b* (see FIGS. 4*a* through 4*d*) induces an arcuate shape to the printed label 22R. As such, the curvature increases the bending stiffness of the label 22R, i.e., about an axis orthogonal to the feed path FP, to facilitate separation thereof from the liner material 48. Furthermore, the curvature imparts a degree of buckling stability and prevents the label 22R from contacting a lower edge LE of the dispensing outlet D as the application ready label 22R awaits removal by an operator.

In FIG. 7, another operating mode is depicted wherein the application ready label (not shown) has been removed and the label material 38 is reeled, or taken-in, in the direction of arrow RE. This mode of operation may be viewed as optional and may only be employed to minimize the amount of waste material 38W. In this mode of operation, the label and/or liner material 38, 48 may be taken-in by the web/spool of supply material or via the first pair of rollers 74. When the previous transverse kiss-cut KC has nearly reached or moved past the second cutting apparatus 90, the motion of the label and/or liner material 38, 48 is paused to cut the remaining waste material 38W, i.e., principally liner material 48 however, a small portion of face material 46 may be included to effect a clean cut through the label material 38.

In FIG. 8, the end deflector portion 52D of the peeler guide 52 directs the waste material 38W through the waste outlet W. The position of the waste outlet W, i.e., below the dispensing outlet D, facilitates removal and collection of waste material 38W in a waste receptacle (not shown). That is, the waste outlet W is disposed through a lower portion of the housing 50 such that gravity may augment the release and removal of the waste material 38W.

In FIGS. 9 and 10, the second operating mode of the label dispensing system 20 is depicted wherein a length or stack of printed labels 22L is produced and dispensed through the dispensing outlet D. More specifically, in FIG. 9, the peeler guide 52 has been repositioned, i.e., pivoted in a clockwise direction CW, from the first position to the second position. The processor 24 issues a signal to the linear actuator 68 to rotate and translate the peeler guide 52 down and away from the first pair of rollers 74, i.e., a motion produced by the four-bar linkage arrangement discussed earlier in the detailed description. The label material 38 is paid-out through the first pair of rollers 74 such that the liner material 48 thereof rides along, and is supported by, the upper surface 52U of the peeler guide 52. To maintain positive control of the label material 38 as it slides over the upper surface 52U, the roller assembly 70 is biased downwardly to urge the label material 38 against the upper surface 52U of the peeler guide 52.

In FIG. 9, the label material 38 is paid-out and paused such that the first cutting apparatus 80 may produce a kiss-cut KC through the face material 46 immediately upstream of the postage indicia and/or image printed on the face of the label material 38. While the label material 38 is being paid-out, a subsequent label 22 may be printed at the print station 12. Alternatively, the label material 38 may be retracted/reeled-in before producing a kiss-cut, and advanced/paid-out during print operations to maximize utilization of the label material 38, i.e., to minimize gaps of empty space or non-printing area between consecutive labels 22.

Notwithstanding the synchronization of the printing and dispensing operations, in FIG. 10, the label material 38 is paid-out, kiss-cut between each printed label 22L, and dispensed through the dispensing outlet D. Once the number of lined labels 22L have been printed, the second cutting apparatus 90 severs the label material 38 to separate the stream of lined labels 22L from the supply 36. Alternatively, individual lined labels 22L may be produced and dispensed through the outlet D by severing each lined label 22L from the upstream supply 36 and conveying each through the first pair of rollers 74 while being guided and supported along the upper or outer surface 52U of the peeler guide 52. In another embodiment of the invention, the stream of individual lined-labels 22L may include one or more tabs (not shown) upstream of a kiss cut, or between consecutive kiss-cuts, to facilitate removal of the liner material 48. That is, the first cutting apparatus 80 may produce consecutive kiss-cuts, or a kiss-cut followed by a thru-cut made by the second cutting apparatus 90, such that a small gripper tab of face material 46 remains therebetween. The gripper tab facilitates separation of the printed label from the liner material as the operator uses the tab to bend the lined-label about the kiss cut.

In summary, the system for dispensing labels 22 operates in at least two operating modes to dispense (i) printed labels 22R in a condition ready for application, (ii) waste material 38W, and (iii) lined labels 22L which may be used at any time or at any location produced. A first mode of operation dispenses application ready labels 22R through the dispensing outlet D in an optimum orientation for immediate application. In another operating mode, waste material 38W is discarded through a bottom/lower waste outlet W and uses gravity to augment collection and removal of waste material 38W, i.e., into a waste receptacle. And, in a second operating mode lined labels 22L are dispensed as a stream of tandemly arranged printed labels 22L or stacked for use at a subsequent time or at a remote location.

It is to be understood that the present invention is not to be considered as limited to the specific embodiments described above and shown in the accompanying drawings. For example, while the peeler guide 52 has been depicted as inducing a first bend about longitudinal axes 52LA and a second bend about a transverse axis 52TA, i.e., a first bend upstream of a second bend, it will be appreciated that the curvature induced by the peeler guide 52 may occur coincidentally or simultaneously. Furthermore, the bends induced may be more or less aggressive depending upon the strength and width of the adhesive backing AB employed. Additionally, the geometry of the peeler guide 52 may vary depending upon the location and width of the non-adhesive regions NA. The principle requirement, however, is that the peeler guide 52 induce a bend about a longitudinal cut 47, adjacent a non-adhesive region of the label material 38 such that edge 46E of the printed label 22 or face material 46 projects through the opening 58 in the upper guide member 54*a*.

The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A postage label dispensing system for dispensing adhesive-backed labels, comprising:

a system for displacing a supply of label material along a feed path, the label material including a face material having an adhesive backing and a liner material detachably bonded to the adhesive backing, the adhesive backing defining longitudinal adhesive strips and at least one non-adhesive region disposed therebetween, the face material having at least one longitudinal cut disposed adjacent to, and aligned with, the non-adhesive region;

a peeler guide disposed along the feed path and having upper and lower guide members operative to: (i) guide the label material therebetween, (ii) induce a bend in the liner material along an axis substantially parallel to the at least one longitudinal cut, and (iii) separate an edge of the face material from the liner material along at least a portion of the longitudinal cut, the upper guide member defining an opening for receiving the edge upon separation from the liner material and dispensing an application-ready label through the opening; and a processor, operative to control the conveyance system to draw the label material through the guide members such that the separated edge of the application-ready label is dispensed through the opening in the upper guide member of the peeler guide.

2. The postage label dispensing system according to claim 1 wherein the backing material defines non-adhesive regions disposed between a plurality of longitudinal adhesive strips, wherein the face material includes longitudinal cuts disposed adjacent to, and aligned with, the non-adhesive regions, and wherein the opening in the upper guide member includes an arcuate separation edge operative to interpose the separated edge of the face material and the liner material as the label material is drawn through the peeler guide.

3. The postage label dispensing system according to claim 1 wherein the guide members of the peeler guide induce a bend in the liner material along an axis substantially orthogonal to the feed path to separate a leading edge of the face material from the liner material thereby augmenting dispensation of the application-ready label.

4. The postage label dispensing system according to claim 1 wherein peeler guide includes a displacement mechanism for repositioning the guide members from a first position to a second position, wherein the processor is operative to control the displacement mechanism and the position of the peeler guide such that, in the first position, label material is drawn through and between the guide members of the peeler guide to dispense application-ready labels, and, in the second position, label material is conveyed along, and supported by, an upper surface of the upper guide member to dispense a plurality of lined-labels through a dispensing outlet.

5. The postage label dispensing system according to claim 4 wherein the displacement mechanism includes a four-bar linkage mounting to the lower guide member for raising and lowering the peeler guide into and out of the first and second positions.

6. The postage label dispensing system according to claim 4 wherein the displacement mechanism includes a means for lowering and raising the upper guide member relative to the lower guide member such that when lowered, the upper guide member cooperates with the lower guide member to dispense application-ready labels and, when raised, the upper guide member disengages the label material and lined-labels are conveyed along, and supported by, an upper surface of the lower guide.

7. The postage label dispensing system according to claim 1 wherein the face material includes a transverse cut across the width of the label material, wherein the complementary surfaces of the guide members induce longitudinal bends about axes adjacent to, and substantially parallel with, the longitudinal cuts in the face material, such that each of the side edges of the label material transition from a substantially horizontal to a substantially vertical orientation and wherein the complementary surfaces of the guide members induce a transverse bend about an axis adjacent to and substantially parallel with, the transverse cut in the face material such the liner material is directed downwardly through a waste outlet of the housing.

8. The postage label dispensing system according to claim 1 wherein the face material includes a transverse cut across the width of the label material, wherein the transverse cut is produced by a first cutting apparatus operative to produce a kiss-cut through the face material of the label material and wherein the processor is operative to control the displacement of the label material relative to the first cutting apparatus to vary the length dimension of a printed label.

9. The postage label dispensing system according to claim 8 wherein the first cutting apparatus includes a disc-shaped cutter having a cutting edge and a rotational axis parallel to the feed path of the label material, the disc-shaped cutter including a least one bearing surface radially inboard of the cutting edge to control the depth of the kiss-cut into the label material.

10. The system according to claim 8 further comprising a second cutting apparatus disposed upstream of the first cutting apparatus to cut through the label material and produce a length of waste material, and wherein the processor is operative to control the operation of the second cutting apparatus and conveyance system such that the waste material is dispensed through a waste outlet of the housing.

11. The postage label dispensing system according to claim 1 wherein the supply of label material includes a plurality of transverse cuts through the width of the label material at predetermined intervals along the length of the material supply.

12. The system according to claim 1 wherein the guide surface of the lower guide member defines a cross-section orthogonal to the feed path of the label material, the cross-section defining a surface having a convex curvature to impart a complimentary curvature to the printed label upon dispensation of each application ready label.

13. A mailing machine, comprising:

a print station adapted to print postage indicia on a face surface of one of a mailpiece envelope and an adhesively-backed label having an adhesive-backed face material and a lining material covering the adhesive backing of the face material, the print station having a print head adapted to move from a first position to a second position wherein, in the first position, the print head is disposed along the feed path of a processed mailpiece, and, in the second position, the print head is disposed along the feed path of the label material;

a mailpiece transport system operative to convey a sealed mailpiece across the print head of the print station to receive the postage indicia, a postage label dispensing system including:

a supply of label material including a face material having an adhesive backing and a liner material detachably bonded to the adhesive backing, the adhesive backing defining a plurality of longitudinal adhesive strips and non-adhesive regions disposed therebetween, the face material having longitudinal cuts disposed adjacent to, and aligned with, each of the non-adhesive regions;

a label transport system for conveying a supply of label material across the print head of the print station to receive the postage indicia and operative to convey the label material along the feed path;

a first cutting apparatus adapted to produce a transverse cut across the width dimension of the face material, each transverse cut defining a length of a printed label;

a peeler guide disposed along the feed path and having upper and lower guide members operative to: (i) guide the label material therebetween, (ii) induce a bend in the liner material along an axis substantially parallel to each longitudinal cut, and (iii) separate opposed side edges of the face material from the liner material along at least a portion of each longitudinal cut, the upper guide member defining an opening for receiving each side edge upon separation from the liner material and dispensing an application-ready label through the opening; and a processor, operative to control the conveyance system to draw the label material through the guide members such that the separated side edges of the face material are dispensed through the opening in the upper guide member of the peeler guide.

14. The postage label dispensing system according to claim 13 wherein the backing material defines non-adhesive regions disposed between a plurality of longitudinal adhesive strips, wherein the face material includes longitudinal cuts disposed adjacent to, and aligned with, the non-adhesive regions, and wherein the opening in the upper guide member includes an arcuate separation edge operative to interpose the separated edge of the face material and the liner material as the label material is drawn through the peeler guide.

15. The postage label dispensing system according to claim 13 wherein the guide members of the peeler guide induce a bend in the liner material along an axis substantially orthogonal to the transverse cut to separate a leading edge of the face material from the liner material thereby augmenting dispensation of the application-ready label.

16. The postage label dispensing system according to claim 13 wherein peeler guide includes a displacement mechanism for repositioning the guide members from a first position to a second position, wherein the processor is operative to control the displacement mechanism and the position of the peeler guide such that, in the first position, label material is drawn through and between the guide members of the peeler guide to dispense application-ready labels, and, in the second position, label material is conveyed along, and supported by, an upper surface of the upper guide member to dispense a plurality of lined-labels through the dispensing outlet of the housing.

17. The postage label dispensing system according to claim 16 wherein the displacement mechanism includes a four-bar linkage mounting to the lower guide member for raising and lowering the peeler guide into and out of the first and second positions.

18. The postage label dispensing system according to claim 16 wherein the displacement mechanism includes a means for lowering and raising the upper guide member relative to the lower guide member such that when lowered, the upper guide member cooperates with the lower guide member to dispense application-ready labels and, when raised, the upper guide member disengages the label material and lined-labels are conveyed along, and supported by, an upper surface of the lower guide.

19. The postage label dispensing system according to claim 13 wherein the face material includes a transverse cut across the width of the label material, wherein the complementary surfaces of the guide members induce longitudinal bends about axes adjacent to, and substantially parallel with, the longitudinal cuts in the face material, such that each of the side edges of the label material transition from a substantially horizontal to a substantially vertical orientation and wherein the complementary surfaces of the guide members induce a transverse bend about an axis adjacent to and substantially parallel with, the transverse cut in the face material such the liner material is directed downwardly through a waste outlet of the housing.

20. The postage label dispensing system according to claim 13 wherein the face material includes a transverse cut across the width of the label material, wherein the transverse cut is produced by a first cutting apparatus operative to produce a kiss-cut through the face material of the label material and wherein the processor is operative to control the displacement of the label material relative to the first cutting apparatus to vary the length dimension of a printed label.

21. The system according to claim 20 further comprising a second cutting apparatus disposed upstream of the first cutting apparatus to cut through the label material and produce a length of waste material, and wherein the processor is operative to control the operation of the second cutting apparatus and conveyance system such that the waste material is dispensed through a waste outlet of the housing.

22. The postage label dispensing system according to claim 13 wherein the supply of label material includes a plurality of transverse cuts at predetermined intervals along the length of the material supply.

23. The postage label dispensing system according to claim 22 wherein the first cutting apparatus includes a disc-shaped cutter having a cutting edge and a rotational axis parallel to the feed path of the label material, the disc-shaped cutter including a least one bearing surface radially inboard of the cutting edge to control the depth of the kiss-cut into the label material.

24. The system according to claim 13 wherein the guide surface of the lower guide member defines cross-section orthogonal to the feed path of the label material, the cross-section defining a surface having a convex curvature to impart a complimentary curvature to the printed label upon dispensation of each application ready label.

* * * * *